(12) United States Patent
Hagirahim et al.

(10) Patent No.: US 7,330,460 B1
(45) Date of Patent: Feb. 12, 2008

(54) METHOD AND APPARATUS FOR PROVIDING EFFICIENT VOIP GATEWAY-TO-GATEWAY COMMUNICATION

(75) Inventors: Hassan Hagirahim, Long Branch, NJ (US); Francis Waldman, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1471 days.

(21) Appl. No.: 09/659,650

(22) Filed: Sep. 12, 2000

(51) Int. Cl.
H04L 12/66 (2006.01)
H04L 12/28 (2006.01)
H04L 12/56 (2006.01)

(52) U.S. Cl. .................. 370/352; 370/395.52
(58) Field of Classification Search ........... 370/351, 370/352, 353, 354, 355, 356, 401, 402
See application file for complete search history.

(56) References Cited

U.S. PATENT DOCUMENTS

| | | | |
|---|---|---|---|
| 5,600,653 A * | 2/1997 | Chitre et al. ............. | 370/474 |
| 6,282,192 B1 * | 8/2001 | Murphy et al. ............. | 370/352 |
| 6,363,065 B1 * | 3/2002 | Thornton et al. ........... | 370/352 |
| 6,404,746 B1 * | 6/2002 | Cave et al. ................ | 370/262 |
| 6,463,053 B1 * | 10/2002 | Chen ......................... | 370/352 |
| 6,477,164 B1 * | 11/2002 | Vargo et al. ................ | 370/356 |
| 6,570,849 B1 * | 5/2003 | Skemer et al. ........... | 370/230.1 |
| 6,678,250 B1 * | 1/2004 | Grabelsky et al. ......... | 370/241 |
| 6,683,877 B1 * | 1/2004 | Gibbs et al. ............. | 370/395.2 |
| 6,717,948 B1 * | 4/2004 | Subbiah ................. | 370/395.64 |
| 6,807,166 B1 * | 10/2004 | Ohura ........................ | 370/352 |
| 6,918,034 B1 * | 7/2005 | Sengodan et al. .......... | 713/160 |

* cited by examiner

*Primary Examiner*—Edan Orgad
*Assistant Examiner*—Blanche Wong (57) ABSTRACT

The invention comprises a system and method for transmitting and receiving multiplexed Voice over Internet Protocol (VoIP) traffic. The invention advantageously provides efficient gateway-to-gateway communication by reducing overhead where at least two conversations are transmitted between VoIP gateways. Additionally, signal degradation is avoided since there is no transcoding of signals.

21 Claims, 7 Drawing Sheets

METHOD AND APPARATUS FOR PROVIDING EFFICIENT VOIP GATEWAY-TO-GATEWAY COMMUNICATION

BACKGROUND OF THE DISCLOSURE

1. Technical Field of the Invention

This invention generally relates to the field of communication systems and, more particularly, to a Voice over Internet Protocol (VoIP) gateway to gateway communication system for use in an Internet Protocol (IP) network.

2. Description of the Background Art

Voice over Internet Protocol (VoIP) is a technology that allows the transmission of voice using an Internet Protocol (IP) network, such as the Internet. For instance, a calling party places a call on a telephone set. The telephone set digitizes the voice signal and transmits the voice signal to a VoIP gateway servicing the calling party. The VoIP gateway, in turn, establishes a call with a VoIP gateway that services the called party.

Presently the International Telecommunication Union—Telecommunication Standardization Sector (ITU-T) Recommendation H.323 specifies the technical requirements for the packets transmitted between VoIP gateways. Each packet has a Real-time Transport Protocol (RTP) header for carrying real time services such as voice and video in a payload portion of the RTP packet, a payload identifier so that the receiving gateway can determine the type of information contained in the packet, and sequence numbers and timstamps for identifying the order of the packets. In addition, the RTP packet is encapsulated in a User Datagram Protocol (UDP) transport/Internet Protocol (IP) layer packet.

Unfortunately, RTP and UDP overheads are too large. For example, the UDP header is 40 bytes and the RTP header is 12 bytes. As conventional methods are used to reduce the size of the Internet Protocol (IP) voice payload from 64 kb/s to as low as 4 kb/s, the RTP and UDP comprise a larger portion of the data actually transmitted resulting in inefficiency when transporting packets between VoIP gateways.

SUMMARY OF THE INVENTION

The invention comprises a system and method for transmitting and receiving multiplexed Voice over Internet Protocol (VoIP) traffic. The invention advantageously provides efficient gateway-to-gateway communication by reducing overhead where at least two conversations are transmitted between the same VoIP gateways. Additionally, signal degradation is avoided since there is no transcoding of signals.

A method of transporting voice traffic from a Voice over Internet Protocol (VoIP) gateway, over an Internet Protocol (IP) network, to a destination, according to the present invention comprises the steps of: receiving voice traffic at the VoIP gateway; determining whether the destination is serviced by a second VoIP gateway; multiplexing the voice traffic at the VoIP gateway; and transporting the multiplexed voice traffic to the second VoIP gateway utilizing a plurality of transport packets, responsive to an affirmative determination that the destination is serviced by the second VoIP gateway.

An apparatus for transporting voice traffic over an Internet Protocol (IP) network to a destination, according to the present invention, comprises: a first Voice over Internet Protocol (VoIP) gateway, for receiving voice traffic; the first VoIP gateway determining whether said destination is serviced by a second VoIP gateway; the first VoIP gateway multiplexing said voice traffic; the first VoIP gateway transporting the multiplexed voice traffic to the second VoIP gateway utilizing a plurality of transport packets, responsive to an affirmative determination that the destination is serviced by the second VoIP gateway.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of a pair of subscribers (A and B) communicating via Voice over Internet Protocol (VoIP) utilizing different transport mediums, for example Digital Subscriber Line (DSL), Plain Old Telephone Service (POTS), cellular and cable modem technologies. It should be noted by those skilled in the art that the applicability of the present invention is not limited to this embodiment.

Figure 1:
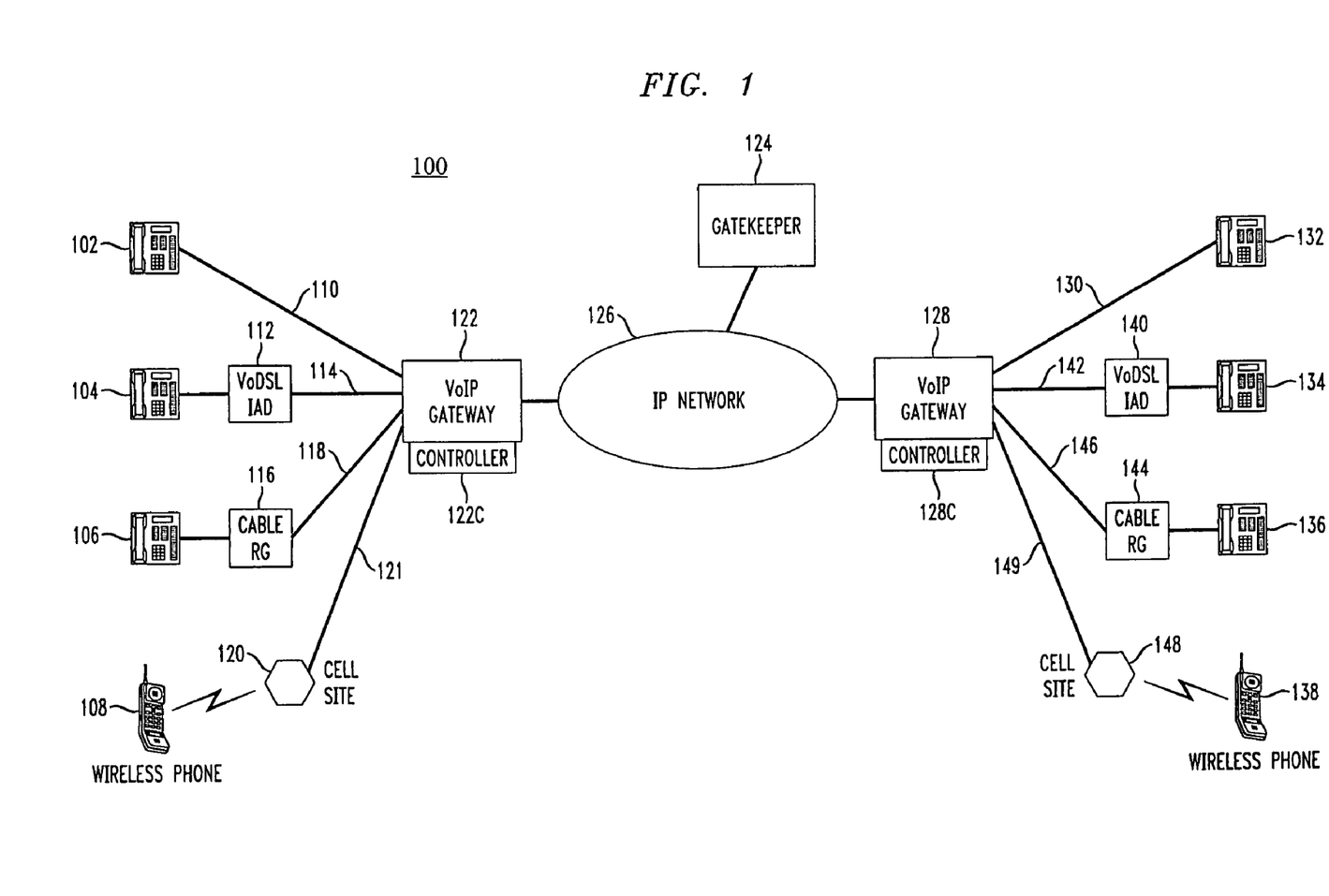
FIG. 1 depicts a high level block diagram of a communications system including the present invention.

FIG. 1 depicts a high level block diagram of a communications system including the present invention. Specifically, the system of FIG. 1 comprises a first VoIP gateway 122 which is coupled to a telephone 102 via a transmission medium 110 (illustratively, a copper pair, coaxial cable, fiber optic cable or the like), a first Voice over Digital Subscriber Service Line (VoDSL) Integrated Access Device (IAD) 112 via a transmission medium 114, a cable modem 116 via a transmission medium 118, and a first cell site 120 via a transmission medium 121. First VoDSL IAD 112 is in turn coupled to a terminal 104 (illustratively, a telephone, a Personal Computer (PC) or workstation). A terminal 106 is coupled to cable modem 116. A cellular phone 108 is coupled to first cell site 120 via a radio frequency link.

It should be noted that the present invention does not require a specific DSL service type, such as Asymmetric Digital Subscriber Line (ADSL), Rate Adaptive DSL (RADSL), Single-line DSL (SDSL), Integrated Services Digital Network (IDSL) and the like. Therefore, those skilled in the art and informed by the teachings of the present invention will be able to readily adapt any appropriate DSL service type to the present invention.

The first VoIP gateway 122 is coupled to an Internet Protocol (IP) network 126. Also coupled to IP network 126 is a second VoIP gateway 128 and, optionally, a gatekeeper 124. The gatekeeper has a database (not shown) for storing IP addresses which correspond to telephone numbers. Each VoIP gateway 122, 128 has a plurality of User Datagram Protocol (UDP) ports (not shown) as well as a respective VoIP gateway controller 122C and 128C respectively. Second VoIP gateway 128 is coupled to a telephone 132 via a transmission medium 130, a second Voice over Digital Subscriber Service Line (VoDSL) Integrated Access Device (IAD) 140 via a transmission medium 142, a second cable modem 144 via a transmission medium 146, and a second cell site 148 via a transmission medium 149. Second VoDSL IAD 140 is in turn coupled to a terminal 134. In addition, a terminal 136 is coupled to second cable modem 144, and cellular phone 138 is coupled to second cell site 148 via a radio frequency link.

It should be noted that the operation of the first VoIP gateway 122 is similar to the operation of the second VoIP gateway 128. As such, only differences between the first VoIP gateway 122 and second VoIP gateway will be described in more detail.

As a call arrives at the first VoIP gateway 122, for example from a DSL subscriber, first VoIP gateway 122 compares the phone number of the called party to a database which has a corresponding IP address for a VoIP gateway (e.g. VoIP gateway 128) that serves the called party. After a determination is made that the second VoIP gateway exists and is compatible, via signaling messages communicated between the respective gateways another determination is made by the first VoIP gateway 122 whether traffic is being presently provided to the second VoIP gateway 128. If traffic is currently being provided to the second VoIP gateway 128, voice traffic from the recent call is encapsulated with a modified Real-time Transport Protocol (RTP) which will be discussed more fully in FIG. 3. The modified RTP packet is then multiplexed with other voice traffic going to the second VoIP gateway 128 and encapsulated in a User Datagram Protocol (UDP) transport packet. The UDP transport packet with the encapsulated modified multiplexed RTP packets are communicated to the second VoIP gateway 128 via a logical link. If traffic is not currently being provided to the second VoIP gateway 128, the modified RTP packet is encapsulated in a user data protocol transport packet. Multiplexing will then occur when traffic from other callers is being routed to the second VoIP gateway 128.

It should be noted that each modified RTP packet includes an identifier for each caller. This way when a call becomes inactive for particular callers and called parties, the logical link is not broken but remains up until all calls become inactive.

At the second VoIP gateway 128, the UDP/IP packet is received and the modified RTP packets are demultiplexed and decoded. Each call is then routed to the appropriate destination.

In another embodiment of the invention, the gatekeeper 124 can be used to look up IP addresses for corresponding telephone numbers.

It should be noted by those skilled in the art that although the invention is described in the context of a call being established in one direction, the call can be established in either direction and communication between the respective gateways 122 and 128 can occur simultaneously according to the present invention.

Figure 2:
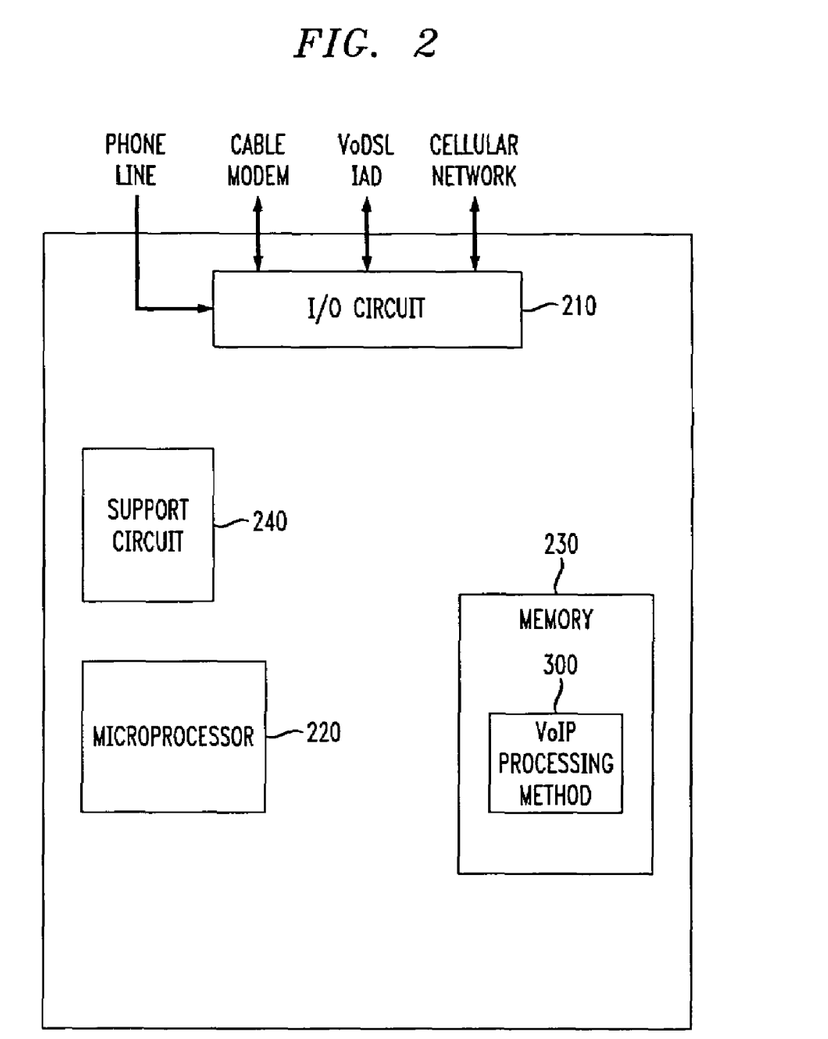
FIG. 2 depicts a high level block diagram of an embodiment of the controller suitable for use within a Voice over Internet Protocol (VoIP) gateway.

FIG. 2 depicts a high level block diagram of an embodiment of the controller suitable for use within a Voice over Internet Protocol (VoIP) gateway. Specifically, FIG. 2 depicts a high level block diagram of a VoIP gateway 122 suitable for use in the communication system 100 of FIG. 1. The VoIP gateway controller 122C comprises a microprocessor 220 as well as memory 230 for storing programs 250 such as VoIP processing method 300 which will be described more fully below in a discussion of FIG. 3. The microprocessor 220 cooperates with conventional support circuitry 240 such as power supplies, clock circuits, cache memory and the like as well as circuits that assist in executing the software methods of the present invention. As such, it is contemplated that some of the process steps discussed herein as software processes may be implemented with hardware, for example, a circuitry that cooperates with the microprocessor 220 to form various steps.

The VoIP gateway controller 122C also comprises input/output circuitry 210 that forms an interface between the microprocessor 220, the IP network 126, telephone 102, VoDSL IAD 112, cable RG 116, cell site 120, and other VoIP circuitry (not shown).

Although the VoIP controller 122C is depicted as a general purpose computer that is programmed to perform VoIP control and processing functions in accordance with the present invention, the invention can be implemented in hardware, in software, or a combination of hardware and software. As such, the processing steps described above with respect to the various figures are intended to be broadly interpreted as being equivalently performed by software, hardware, or a combination thereof.

It will be appreciated by those skilled in the art that the VoIP controller 122C provides sufficient computer functionality to implement the invention as described above.

Figure 3A:
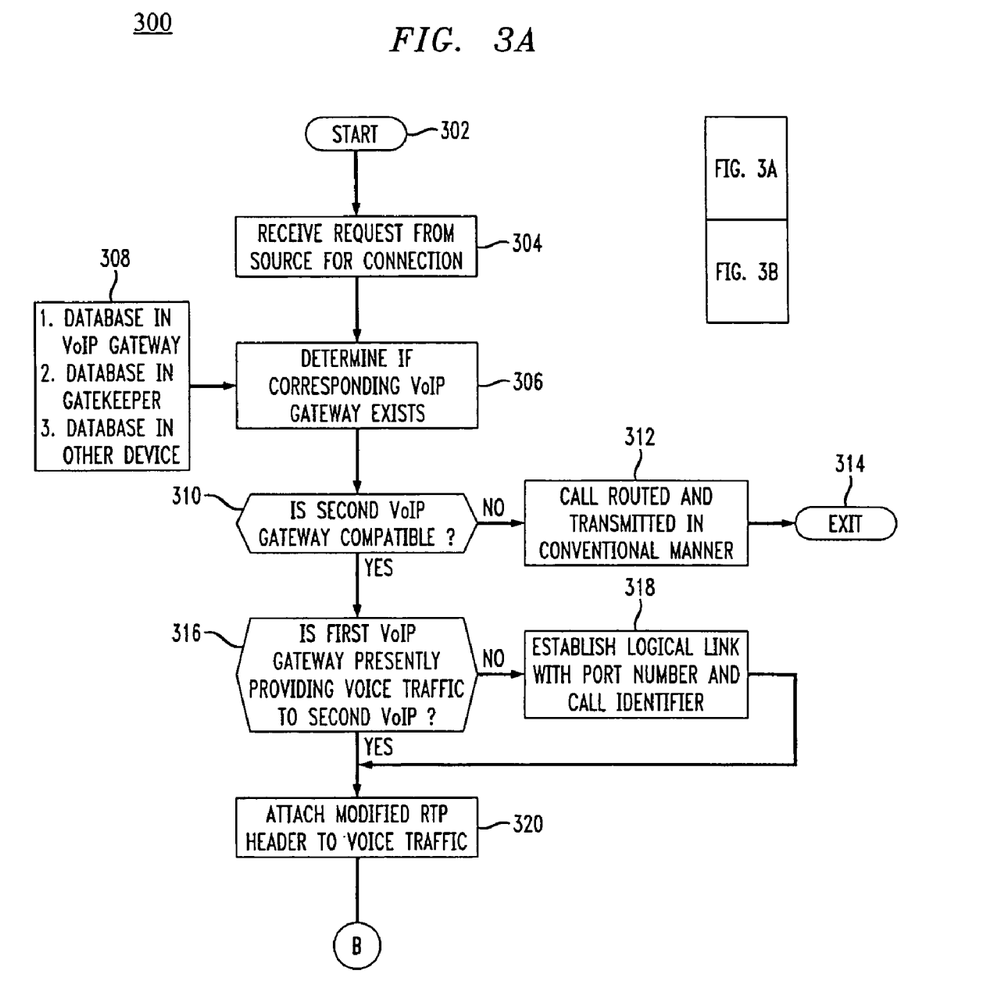
FIG. 3 depicts a flow diagram of a method for providing VoIP gateway to gateway communication over the Internet Protocol (IP) network according to the invention.
Figure 3B:
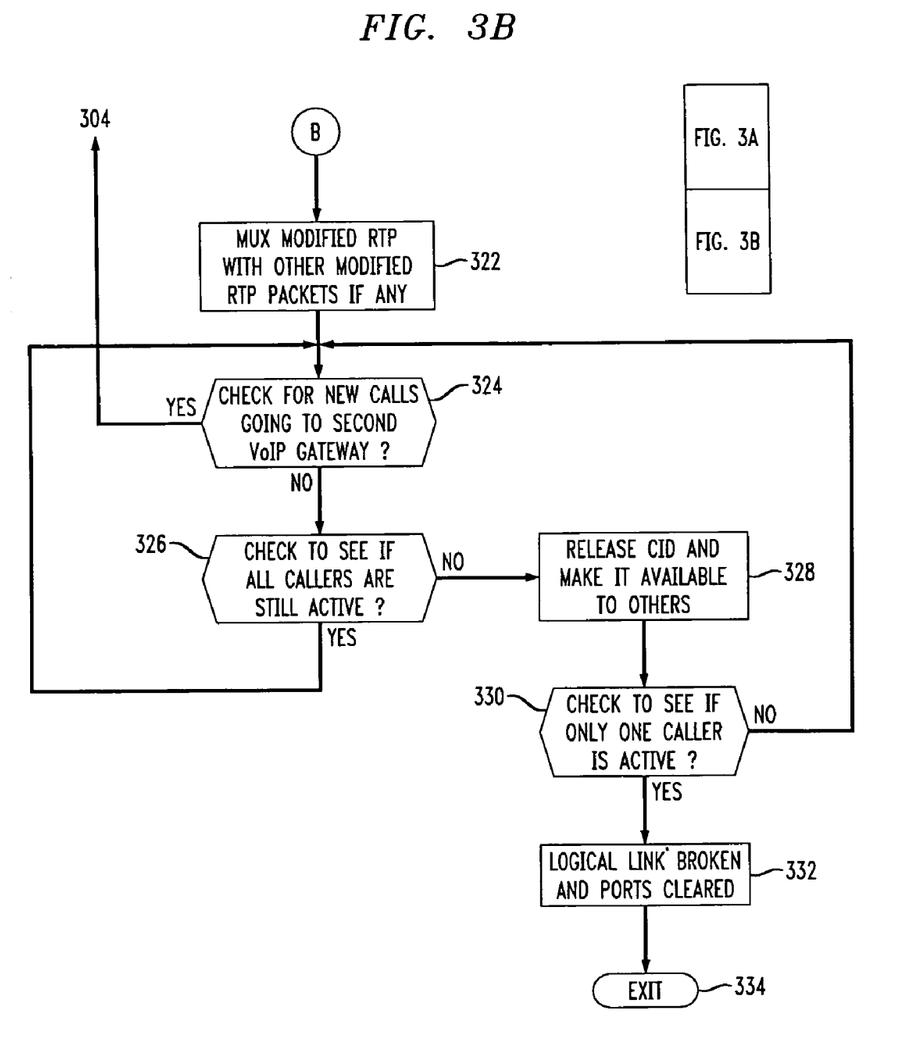

FIG. 3 depicts a flow diagram of a method for providing VoIP gateway to gateway communication according to the invention. The method 300 of FIG. 3 may be stored in the VoIP controller 122C in, for example, memory 230 within the portion used for storage of various programs 250.

The method 300 is initiated at step 302 and proceeds to step 304, where the first VoIP gateway 122 receives a request from a source to connect to a respective destination. It should be noted that the first VoIP gateway may also receive multiple requests from multiple sources for connections to multiple destinations.

At step 306 a determination is made as to whether the requested destination is served by a corresponding VoIP gateway (e.g. VoIP gateway 128) via signaling messages between the respective VoIP gateways. Box 308 provides exemplary means of determining whether such a corresponding VoIP gateway exists. Specifically, the telephone number of the called party can be compared to a database in the first VoIP gateway 122 which contains a list of telephone numbers and respective IP addresses of VoIP gateways which serve those telephone numbers. Alternatively, a gatekeeper 124 including such data can be used in order to conserve memory in the VoIP gateways. The gatekeeper 124 will look up a respective IP address for the called party. In addition, any type of memory storage device can be used in place of a VoIP gateway or gatekeeper to store telephone numbers and corresponding IP addresses. The method 300 then proceeds to step 310.

At step 310 a query is made as to whether a second VoIP gateway 128 found at step 306 is compatible with the first VoIP gateway 122. Compatibility is defined as being able to demultiplex and decode the data structure used in the present invention. If the query at step 310 is answered negatively, the method 300 proceeds to step 312 where the call is routed and transmitted in a conventional manner. That is, if a second gateway does not exist, or an existing second gateway is not compatible, then conventional call routing is employed. The method then proceeds to step 314 where it exits.

If the query at step 310 is answered affirmatively, the method proceeds to step 316 where a query is made as to whether first VoIP gateway 122 presently provides voice traffic to second VoIP gateway 128. If the query at step 316 is answered affirmatively, the method then proceeds to step 320. If the query at step 316 is answered negatively, the method then proceeds to step 318 where a logical link is established between first VoIP gateway 122 and second VoIP gateway 128 with a port number and call identifier. The matter 300 then proceeds to step 320.

At step 320 the voice traffic is appended with a modified Real-time transport protocol header according to the present invention. In communicating to each other, each respective gateway communicates a UDP port number to the other gateway in which to access the gateway and a call identifier in which to differentiate the respective callers. For instance, the first VoIP gateway 122 may communicate that a transmission is occurring on port number 2 and the calling party is identified as caller number 7. The second gateway 128 will respond with a port number (i.e., port number 7) and identify the called party as number 5.

At step 322, the new call is multiplexed with the other, if any, ongoing conversations onto a UDP/IP packet. It should be noted that the addition of the newly multiplexed voice traffic is constrained by Quality of Service issues such as the number of modified RTP packets which can be multiplexed due to latency, delay and time stamp constraints, etc.

At step 324, a query is made as to whether any additional modified RTP packets from new callers need to be multiplexed. If the query at step 326 is answered affirmatively, the method proceeds to step 304. If the query at step 324 is answered negatively, the method proceeds to step 326.

At step 326 a query is made as to whether all callers are still active. If the query at step 326 is answered affirmatively, the method proceeds to step 324. If the query at step 326 is answered negatively, the method proceeds to step 330 where any inactive callers are dropped and the inactive caller's respective call identifier is released and made available for assignment to future callers.

At step 330 a query is made as to whether only one caller is active. If the query is answered negatively, the method proceeds to step 324. If the query at step 330 is answered affirmatively, the method proceeds to step 332 where the logical link is broken and the port is cleared. The method then proceeds to step 334 where it ends.

Figure 4:
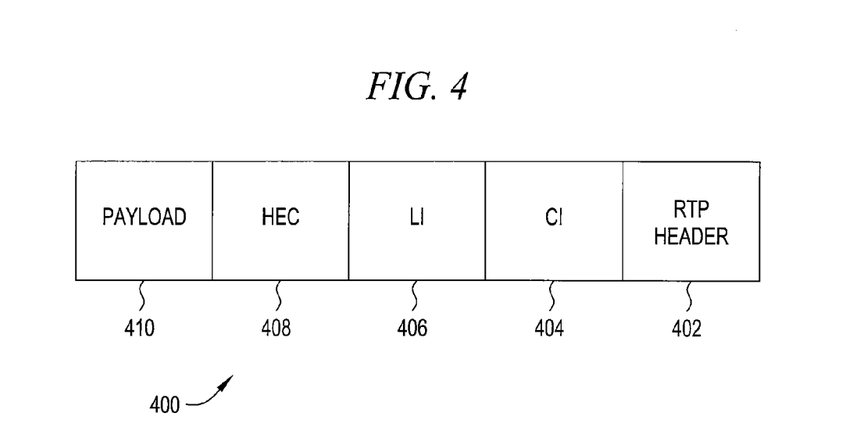
FIG. 4 depicts a diagram of a modified H.323 packet data structure useful in understanding the operation of the communications system in FIG. 1.

FIG. 4 depicts a diagram of a modified H.323 packet data structure useful in understanding the operation of the communications system in FIG. 1. Specifically, FIG. 4 shows the packet data structure of a modified Real-time Transport Protocol (RTP) packet, according to the present invention, that may be used to transport voice and other data between VoIP gateways, such as first VoIP gateway 122 and second VoIP gateway 128. Any differences between the standard RTP packet structure and the modified RTP packet structure of FIG. 4 comprise data structure modifications according to the present invention. The standard or unmodified RTP packet data structure is more thoroughly described in the International Telecommunication Union—Telecommunication Standardization Sector (ITU-T) Recommendation H.323, which is incorporated herein by reference in its entirety.

The data structure of modified RTP packet 400 comprises a conventional RTP header 402, an RTP Payload 410, and the following additional fields: a Call Identifier field (CI) 404 for identifying a caller between a telephone set and a respective gateway; a Length Indicator field (LI) 406 for identifying the size of the payload; and a Header Error Check (HEC) field 408 for identifying errors in the Call Identifier field 404 and the Length Indicator field 406. It should be noted by those skilled in the art that HEC field 408 can be modified to identify errors in additional fields. The size of Call Identifier field 404 is one byte, but may be larger depending on the number of terminals or telephone sets coupled to a respective gateway. The HEC field 408 is preferably one byte.

In another embodiment of the modified RTP packet data structure of the present invention, Header Error Checker field 408 allows one bit error correction due to errors induced by noise, interference and other environmental conditions. This error correcting capability improves Quality of Service (QoS) for the traffic represented by the packets transmitted between the VoIP gateways.

Figure 5:
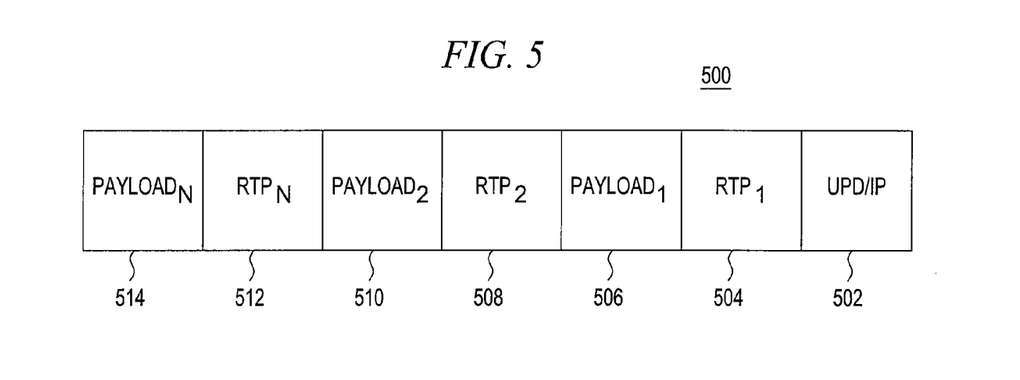
FIG. 5 depicts a transport packet data structure comprising multiple RTP payloads.

The above described packet structure may be transported as payload within a transport data packet structure as depicted in FIG. 5. Specifically FIG. 5 depicts a User Datagram Protocol (UDP)/Internet Protocol (IP) transport layer packet comprising multiple modified RTP packets and payloads. The UDP/IP packet data structure is more thoroughly described in the International Telecommunication Union—Telecommunication Standardization Sector (ITU-T) Recommendation H.323.

A UDP/IP packet 500, according to the invention, comprises multiple modified RTP packets as illustrated in FIG. 5, where RTP1 504 and associated payload 506, RTP2 508 and associated payload 510, up to RTPN 512 and associated payload 514 are independent from each other and are encapsulated in a common UDP/IP packet 500 having a UDP header 502.

Figure 6A:
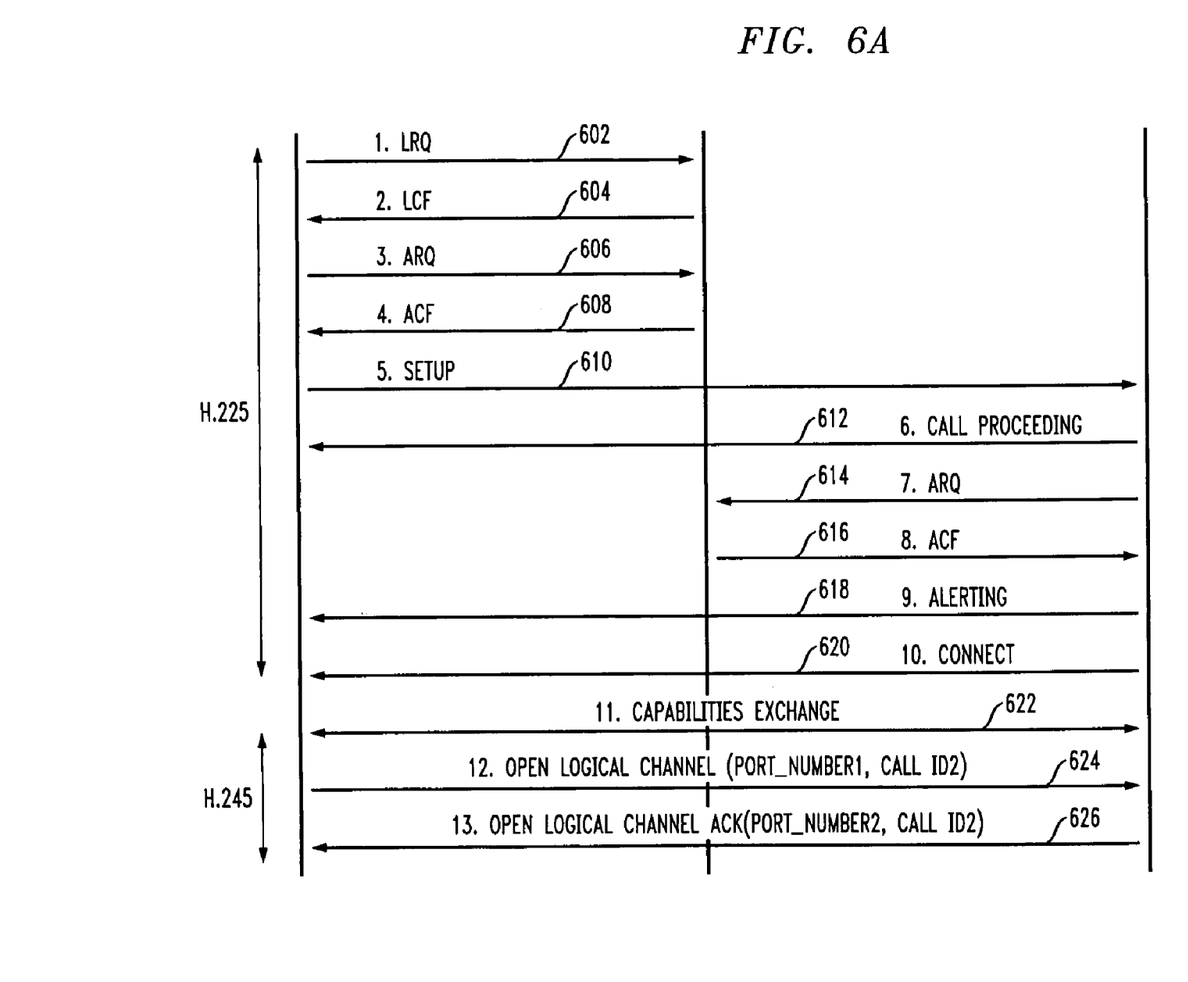
FIG. 6 depicts a call flow diagram useful in understanding an embodiment of the present invention.
Figure 6B:
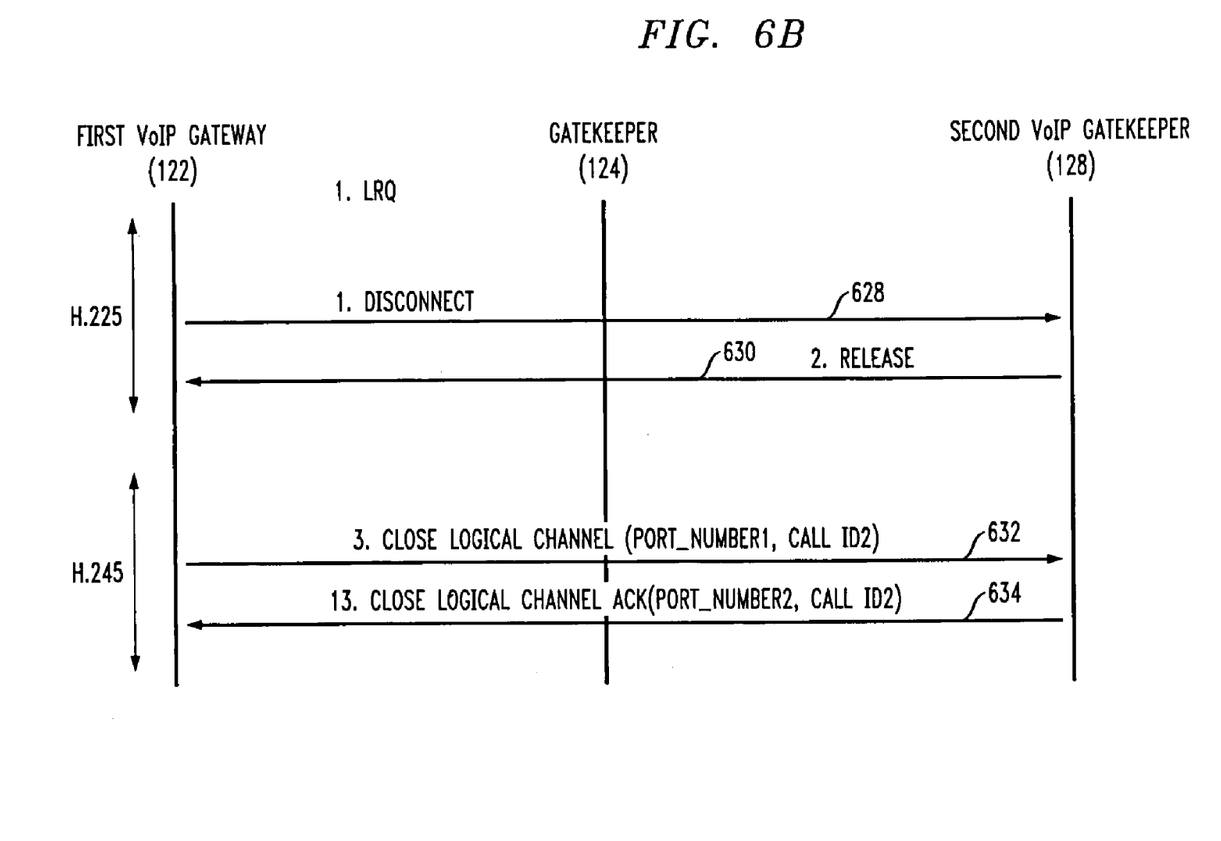

FIG. 6 depicts a call flow diagram useful in understanding an embodiment of the present invention. In the call flow diagram of FIG. 6, the signaling for the call setup and disconnect among first VoIP gateway 122, gatekeeper 124 and second VoIP gateway 128 is defined in the International Telecommunication Union—Telecommunication Standardization Sector (ITU-T) Recommendation H.225, which is incorporated herein by reference in its entirety. Control operations as well as capabilities exchange is defined in the International Telecommunication Union—Telecommunication Standardization Sector (ITU-T) Recommendation H.245, which is incorporated herein by reference in its entirety.

H.225 signaling begins with party A initiating an Internet call by picking up telephone 102 and dialing party B's telephone number which is also known as an E.164 address. At step 602 the first VoIP gateway 122 communicates a Location Request (LRQ) message to gatekeeper 124 seeking the transport address of the second VoIP gateway 128 serving party B's telephone number. Gatekeeper 124 retrieves a table which contains transport addresses for corresponding telephone numbers.

At step 604, gatekeeper 124 communicates a Location Confirmation (LCF) message to first VoIP 122 indicating that a transport address for second VoIP 128 was found. The LCF message may also contain the transport address of the second VoIP gateway 128.

Although not shown, gatekeeper 124 can also provide a Location Reject (LRJ) message indicating that for the telephone number given a corresponding transport address for a second VoIP 128 that serves party B can not be found. A failure to detect a corresponding phone number phone number can result, for example, from party A dialing the wrong telephone number, the database for storing telephone numbers and corresponding transport addresses has not been updated or the VoIP gateway serving party B is not recognized by the gatekeeper 124.

At step 606, first VoIP gateway 122 communicates an Admissions Request (ARQ) message to gatekeeper 124 providing admissions control and bandwidth management functions. For instance, first VoIP gateway 122 may specify the requested call's bandwidth to gatekeeper 124.

Gatekeeper 124 responds at step 608 by communicating an Admissions Confirm (ACF) message to the first VoIP gateway 122 indicating that the first VoIP's 122 request for bandwidth has been received and the parameters for the call accepted.

At step 610 first VoIP gateway 122 communicates a Setup message to second VoIP gateway 128 using the transport address. Responsively, at step 612, second VoIP gateway 128 communicates a Call Proceeding message to first VoIP gateway 122 indicating that the Setup message is in process.

At step 614, if VoIP gateway 128 would like to receive the call from VoIP gateway 122, VoIP gateway 128 communicates an ARQ message to gatekeeper 124 providing admissions control and bandwidth management functions.

In response to VoIP gateway's 128 ARQ message, gatekeeper 124 communicates an ACF message at step 616 indicating that VoIP gateway's 128 ARQ message has been received and the parameters for the call accepted.

At step 618, second VoIP gateway 128 communicates an Alerting message to first VoIP gateway 122 indicating that party B's telephone 132 is ringing. When party B picks up telephone 132 at step 420, second VoIP gateway communicates a Connect message to first VoIP gateway 122 indicating that an H.225 call signaling channel has been established.

The call flow diagram of FIG. 6 enters the capabilities exchange stage at step 622 where first VoIP gateway 122 and second VoIP gateway 128 communicate Capabilities Exchange messages with each other. During this process the respective VoIP gateways make known to each other their capability to receive and decode various signals. For example, it is not necessary that a VoIP gateway understand all of the respective VoIP gateway's capabilities. Capabilities not used or understood are simply disregarded by the respective VoIP gateway.

At step 624 first gateway 122 communicates an Open Logical Channel message to second VoIP gateway 128 indicating that a Logical Channel should be opened. The Open Channel message fully describes the content of the Logical Channel, including media type, algorithm in use, any options and all other information needed for second VoIP gateway 128 to interpret the content of the Logical Channel for example. Illustratively, the Open Logical Channel message is depicted as containing port number one as a means for which second VoIP gateway 128 can communicate UDP/IP packets to the first VoIP gateway 122 for the second caller.

Second VoIP gateway 128 responds at step 626 with an Open Logical Channel Acknowledgement message indicating that first VoIP gateway 122 can communicate UDP/IP packets to second VoIP gateway 128 via port number two for the second caller, for example.

The call flow diagram of FIG. 6 enters the call signaling stage at step 628 where first VoIP gateway 122 communicates a Disconnect message to second VoIP gateway 128 indicating that party A has terminated the call.

In response to the termination of the call by party A, at step 630, second VoIP gateway 128 communicates a Release message to first VoIP gateway 122 indicating that the prior message has been received and party B has released the call.

The call flow diagram of FIG. 6 enters the control stage at step 632 where first gateway 122 communicates a Close Logical Channel message to second VoIP 128 indicating that the call for a specified Call Identifier 406 should be terminated. For example, if there was only one call going from the first VoIP gateway 122 to second VoIP gateway 128 on port number one for a caller with a Call Identifier 404 of two, closing the Logical Channel will clear the call with the given Call Identifier 404 of two and clears the UDP port. However, if more than one call was taking place between first VoIP gateway 122 and second VoIP gateway 128, closing the Logical Channel will only clear the call for a specific Call Identifier 406. The UDP port remains intact and other calls remain in progress until the specific user terminates the call.

At step 634, second VoIP gateway 128 communicates a Close Logical Channel Acknowledgement message to first VoIP gateway 122 indicating that the called party has terminated their portion of the call, and the Logical Channel going from second VoIP gateway 128 to first VoIP gateway 122 should be closed for the respective Call Identifier 404.

The above-described invention advantageously provides a means of communicating voice traffic between VoIP gateways in composite call formation form. Moreover, the invention advantageously does not require a conversion of the voice traffic payloads into a different format between gateways. The voice traffic payloads remain intact. Thus avoiding signal degradation and delay in converting payloads into different formats. In this manner, the invention provides a substantial improvement over prior art VoIP gateway-to-gateway communication; thereby providing a signal with reduced overhead where at least two conversations are transmitted between VoIP gateways.

It is noted that the number of modified RTP packets included within a UDP/IP packet is limited by Quality of Service issues. For instance, multiplexing a large number of modified RTP packets will increase system latency and delay due to increased buffering requirements.

Although various embodiments which incorporate the teachings of the present invention have been shown and described in detail herein, those skilled in the art can readily devise many other varied embodiments that still incorporate these teachings.

What is claimed is:

1. A method, comprising the steps of:
receiving first voice traffic at a first Voice over Internet Protocol (VoIP) gateway;
determining whether a destination of the first voice traffic is serviced by a second VoIP gateway;
in response to a determination that said destination is serviced by said second VoIP gateway, multiplexing, at said first VoIP gateway, at least one modified RTP packet conveying said first voice traffic with at least one modified RTP packet conveying second voice traffic being provided to said second VoIP gateway; and
transporting said multiplexed modified RTP packets to said second VoIP gateway utilizing a plurality of User Datagram Protocol (UDP)/Internet Protocol (IP) packets;
wherein each of said modified RTP packets comprises:
a Payload field including voice traffic;
an RTP header;
a Call Identifier field for identifying a caller;
a Length Indicator field for identifying a size of the Payload field; and a Header Error Check field for identifying errors in the Call Identifier field and the Length Indicator field.

2. The method of claim 1, wherein said Header Error Check field performs one bit error correction.

3. The method of claim 1, further comprising the step of communicating messages between said first VoIP gateway and said second VoIP gateway.

4. The method of claim 3, wherein, during a call setup, said first VoIP gateway communicates an Open Logical Channel message to said second VoIP gateway, wherein said Open Logical Channel message includes said first VoIP gateway's port number and a Call Identifier of the calling party.

5. The method of claim 4, wherein, in response to said Open Logical Channel message, said second VoIP gateway communicates an Open Logical Channel ACK message to said second VoIP gateway, wherein said Open Logical Channel ACK message includes said second VoIP gateway's port number and a Call Identifier of the called party.

6. The method of claim 3, wherein, in response to a caller terminating a call, said first VoIP gateway communicates a Close Logical Channel message to said second VoIP gateway, wherein said Close Logical Channel message includes said first VoIP gateway's port number and a Call Identifier of the calling party.

7. The method of claim 6, wherein, in response to said Close Logical Channel message, said second VoIP gateway communicates a Close Logical Channel ACK message to said first VoIP gateway, wherein said Close Logical Channel ACK message includes said second VoIP gateway's port number and a Call Identifier of the called party.

8. The method of claim 1, wherein said step of determining is made utilizing a gatekeeper.

9. In a communication system for transporting voice traffic over an Internet Protocol (IP) network to a destination, apparatus comprising:
   a first Voice over Internet Protocol (VoIP) gateway, for receiving first voice traffic;
   said first VoIP gateway determining whether said destination of said first voice traffic is serviced by a second VoIP gateway;
   said first VoIP gateway, in response to a determination that said destination is serviced by said second VoIP gateway, multiplexing at least one modified RTP packet conveying said first voice traffic with at least one RTP packet conveying second voice traffic being provided to said second VoIP gateway;
   said first VoIP gateway transporting said multiplexed modified RTP packets to said second VoIP gateway utilizing a plurality of User Datagram Protocol (UDP)/Internet Protocol (IP) packets;
   wherein each of said modified RTP packets comprises:
      a Payload field including voice traffic;
      an RTP header;
      a Call Identifier field for identifying a caller;
      a Length Indicator field for identifying a size of the Payload field; and
      a Header Error Check field for identifying errors in the Call Identifier field and the Length Indicator field.

10. The apparatus of claim 9, wherein said Header Error Check field performs one bit error correction.

11. The apparatus of claim 10, further comprising the step of communicating messages between said first VoIP gateway and said second VoIP gateway.

12. The apparatus of claim 11, wherein, during a call setup, said first VoIP gateway communicates an Open Logical Channel message to said second VoIP gateway, wherein said Open Logical Channel message includes said first VoIP gateway's port number and a Call Identifier of the calling party.

13. The apparatus of claim 12, wherein, in response to said Open Logical Channel message, said second VoIP gateway communicates an Open Logical Channel ACK message to said first VoIP gateway, wherein said Open Logical Channel ACK message includes said second VoIP gateway's port number and a Call Identifier for the called party.

14. The apparatus of claim 13, wherein, in response to a caller terminating a call, said first VoIP gateway communicates a Close Logical Channel message to said second VoIP gateway, wherein said Close Logical Channel message includes said first VoIP gateway's port number and a Call Identifier of the calling party.

15. The apparatus of claim 14, wherein, in response to said Close Logical Channel message, said second VoIP gateway communicates a Close Logical Channel ACK message to said first VoIP gateway, wherein said Close Logical Channel ACK message includes said second VoIP gateway's port number and a Call Identifier of the called party.

16. The apparatus of claim 9, wherein a gatekeeper is used to determine whether said second VoIP gatekeeper services said destination.

17. A first Voice over Internet Protocol (VoIP) gateway for transporting voice traffic over an Internet Protocol (IP) network to a destination, comprising:
   a processor; and
   a storage device coupled to said processor and including instructions for controlling said processor, said processor operative with said instructions to:
      receive first voice traffic at said first VoIP gateway;
      determine whether said destination of said first voice traffic is serviced by a second VoIP gateway;
      in response to a determination that said destination is serviced by said second VoIP gateway, multiplex, at said first VoIP gateway, at least one modified RTP packet conveying said first voice traffic with at least one modified RTP packet conveying second voice traffic being provided to said second VoIP gateway; and
      transport said multiplexed modified RTP packets to said second VoIP gateway utilizing a plurality of User Datagram Protocol (UDP)/Internet Protocol (IP) packets;
   wherein each of said modified RTP packets comprises:
      a Payload field including a voice traffic;
      an RTP header;
      a Call Identifier field for identifying a caller;
      a Length Indicator field for identifying a size of the Payload field; and
      a Header Error Check field for identifying errors in the Call Identifier field and the Length Indicator field.

18. A first Voice over Internet Protocol (VoIP) gateway for transporting voice traffic over an Internet Protocol (IP) network to a destination as in claim 17, wherein a gatekeeper is used to determine whether said destination of said first voice traffic is serviced by said second VoIP gateway.

19. A first Voice over Internet Protocol (VoIP) gateway, for transporting voice over an Internet Protocol (IP) network, to a destination, comprising:
   means for receiving first voice traffic at said first VoIP gateway;
   means for determining whether said destination of said first voice traffic is serviced by a second VoIP gateway;

means for multiplexing, at said first VoIP gateway, in response to a determination that said destination is serviced by said second VoIP gateway, at least one modified RTP packet conveying said first voice traffic with at least one modified RTP packet conveying second voice traffic being provided to said second VoIP gateway; and means for transporting said multiplexed modified RTP packets to said second VoIP gateway utilizing a plurality of User Datagram Protocol (UDP)/Internet Protocol (IP) packets;

wherein each of said modified RTP packets comprise:

a Payload field including voice traffic;

an RTP header;

a Call Identifier field for identifying a caller;

a Length Indicator field for identifying a size of the Payload field; and a Header Error Check field for identifying errors in the Call Identifier field and the Length Indicator field.

20. The VoIP gateway of claim 19, wherein said Header Error Check field performs one bit error correction.

21. A method, comprising the steps of:

receiving first voice traffic at a first Voice over Internet Protocol (VoIP) gateway;

transporting the first voice traffic to a second VoIP gateway utilizing a plurality of transport packets if a destination of the first voice traffic is serviced by the second VoIP gateway and second voice traffic is currently being provided to the second VoIP gateway, wherein the transport packets are User Datagram Protocol (UDP)/Internet Protocol (IP) packets, and wherein each of said UDP/IP packets transports at least one modified Real-time Transport Packet (RTP) packet of said first voice traffic and at least one modified RTP packet of said second voice traffic;

wherein each of said modified RTP packets comprises:

a Payload field including voice traffic;

an RTP header;

a Call Identifier field for identifying a caller;

a Length Indicator field for identifying a size of the Payload field; and a Header Error Check field for identifying errors in the Call Identifier field and the Length Indicator field.

* * * * *